United States Patent
Liu et al.

(10) Patent No.: US 11,431,480 B2
(45) Date of Patent: Aug. 30, 2022

(54) SMART COMPRESSOR BASED ON ADAPTIVE CPU/QAT SCHEDULING METHOD

(71) Applicant: EMC IP Holding Company LLC, Hopkinton, MA (US)

(72) Inventors: Bing Liu, Tianjin (CN); Tao Chen, Beijing (CN); Wei Lin, Beijing (CN); Yong Zou, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 283 days.

(21) Appl. No.: 16/509,307

(22) Filed: Jul. 11, 2019

(65) Prior Publication Data
US 2021/0014049 A1  Jan. 14, 2021

(51) Int. Cl.
| | | |
|---|---|---|
| H04L 9/08 | (2006.01) | |
| H04L 9/30 | (2006.01) | |
| G06F 16/174 | (2019.01) | |
| G06F 9/30 | (2018.01) | |
| G06F 9/38 | (2018.01) | |
| H04L 9/34 | (2006.01) | |

(52) U.S. Cl.
CPC ........ H04L 9/0825 (2013.01); G06F 9/30007 (2013.01); G06F 9/3877 (2013.01); G06F 16/1744 (2019.01); H04L 9/30 (2013.01); H04L 9/34 (2013.01)

(58) Field of Classification Search
None
See application file for complete search history.

(56) References Cited

U.S. PATENT DOCUMENTS

| | | | | |
|---|---|---|---|---|
| 9,507,887 B1 * | 11/2016 | Wang | ................. | G06F 3/0685 |
| 9,569,357 B1 * | 2/2017 | Shalev | ............... | G06F 12/0261 |
| 10,482,677 B1 * | 11/2019 | Iyer | .................. | G06F 3/04815 |
| 10,719,366 B1 * | 7/2020 | Gasser | ................. | G06F 9/5044 |
| 2007/0025395 A1 * | 2/2007 | Cardona | ................ | H04L 69/12 370/474 |
| 2008/0098215 A1 * | 4/2008 | Belgaied | ................. | H04L 9/00 713/160 |

(Continued)

*Primary Examiner* — Eleni A Shiferaw
*Assistant Examiner* — Bassam A Noaman
(74) *Attorney, Agent, or Firm* — Womble Bond Dickinson (US) LLP

(57) ABSTRACT

A method, apparatus, and system for assigning the execution of a cryptography and/or compression operation on a data segment to either a central processing unit (CPU) or a hardware cryptography/compression accelerator is disclosed. In particular, a data segment on which a cryptography and/or compression operation is to be executed is received. Status information relating to a CPU and a hardware cryptography/compression accelerator is determined. Whether the operation is to be executed on the CPU or on the hardware accelerator is determined based at least in part on the status information. In response to determining that the operation is to be executed on the CPU, the data segment is forwarded to the CPU for execution of the operation. On the other hand, in response to determining that the operation is to be executed on the hardware accelerator, the data segment is forwarded to the hardware accelerator for execution of the operation.

18 Claims, 8 Drawing Sheets

(56) References Cited

U.S. PATENT DOCUMENTS

| | | | |
|---|---|---|---|
| 2009/0237401 A1* | 9/2009 | Wei | G06T 11/203 |
| | | | 345/423 |
| 2017/0277551 A1* | 9/2017 | Nicholson | G06F 11/3466 |
| 2018/0006806 A1* | 1/2018 | Wang | G09C 1/00 |
| 2018/0024861 A1* | 1/2018 | Balle | G06F 13/385 |
| | | | 718/104 |
| 2018/0103018 A1* | 4/2018 | Chauhan | F15B 5/006 |
| 2018/0157531 A1* | 6/2018 | Bobba | G06F 9/5044 |
| 2018/0173453 A1* | 6/2018 | Danilov | G06F 3/0649 |
| 2019/0079799 A1* | 3/2019 | Kumar | G06F 9/5044 |

* cited by examiner

|  | 4KB | 8KB | 16KB | 32KB | 64KB | 96KB | 128KB |
|---|---|---|---|---|---|---|---|
| CPU latency (us) | 130 | 235 | 521 | 1086 | 1849 | 2826 | 3741 |
| QAT latency (us) | 474 | 427 | 478 | 618 | 1213 | 1885 | 2566 |

FIG. 2

SMART COMPRESSOR BASED ON ADAPTIVE CPU/QAT SCHEDULING METHOD

FIELD OF THE INVENTION

Embodiments of the present invention relate generally to data storage systems. More particularly, embodiments of the invention relate to offloading cryptography/compression operations to a companion accelerator.

BACKGROUND

Intel QuickAssist Technology (QAT) provides security and compression acceleration capabilities to improve performance and efficiency on computing platforms. In particular, a dedicated hardware cryptography/compression accelerator chip, which may be referred to hereinafter as the (Intel) QAT hardware accelerator, is provided. Compute-intensive security and compression operations, such as symmetric cryptography functions, asymmetric cryptography functions, and compression and decompression functions, can be offloaded from the main processor(s) (e.g., the central processing unit "CPU") to the QAT hardware accelerator.

A deduplication storage system can benefit from the Intel QAT because the compression workloads can be offloaded to the QAT accelerator. However, to assign all compression operations to the QAT accelerator is suboptimal.

BRIEF DESCRIPTION OF THE DRAWINGS

Embodiments of the invention are illustrated by way of example and not limitation in the figures of the accompanying drawings in which like references indicate similar elements.

FIG. 2 is a diagram illustrating a table setting forth compression latencies on the CPU and the QAT accelerator for data segments of different sizes.

DETAILED DESCRIPTION

Figure 1:
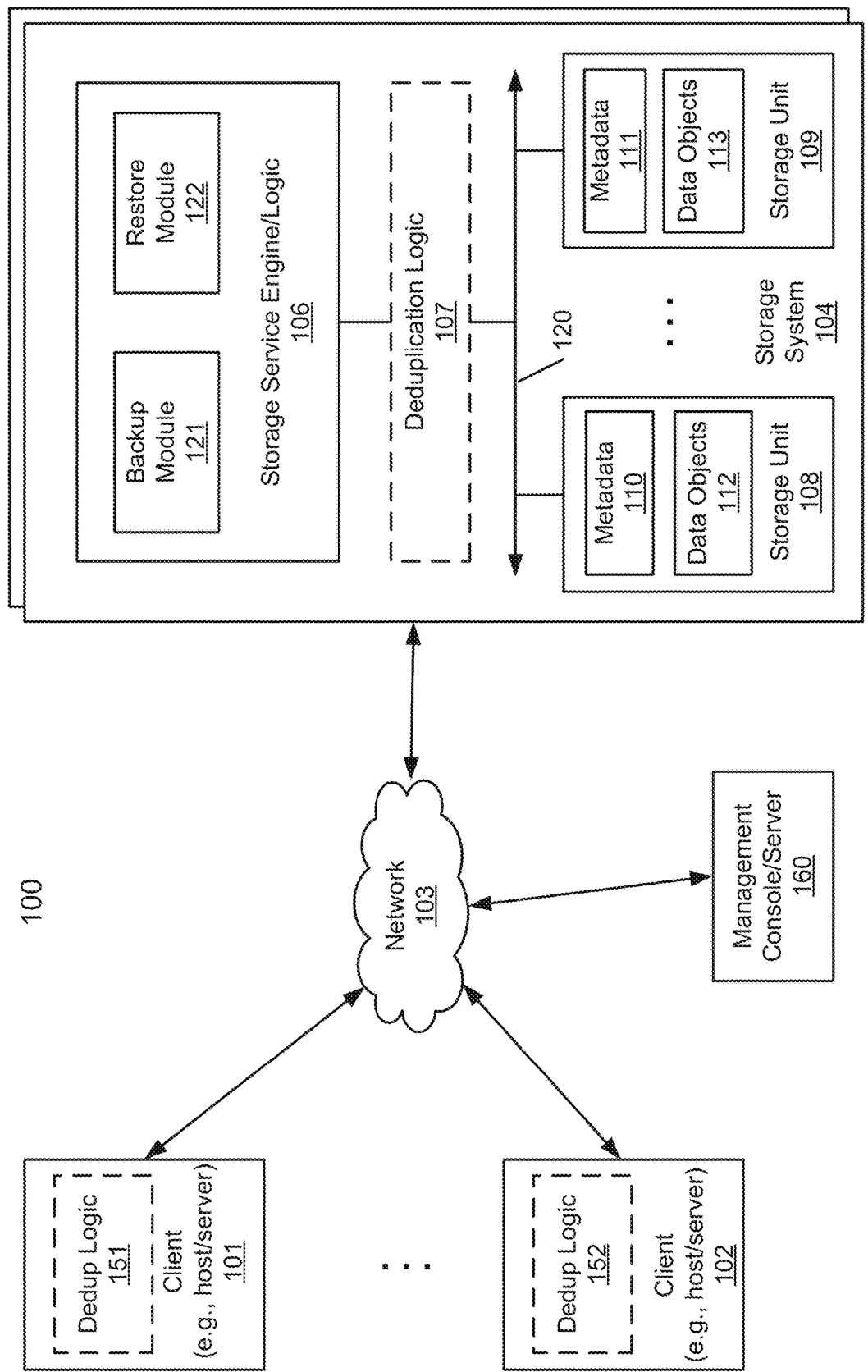
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Adaptive scheduling between the CPU and the QAT accelerator computing resources is desirable for compression operations executed in a deduplication storage system for a number of reasons. First, the compression latency significantly degrades when the QAT accelerator is extremely busy when all compression tasks are assigned to the QAT accelerator. Therefore, it is helpful to monitor the runtime utilization of the QAT accelerator.

Further, CPU utilization is always sensitive in a deduplication storage system, because compute-intensive tasks such as SHA1 hashing, compression, and encryption may be performed simultaneously. If compression takes up excessive CPU resources, the overall system performance is negatively affected. Therefore, returning operations from the QAT accelerator back to the CPU should be done judiciously. At the same time, it is also necessary to monitor the runtime utilization of the CPU.

Differently sized workloads are associated with different relative compression performance differentials between the CPU and the QAT accelerator. Due to the hardware architecture differences between the CPU and the QAT accelerator, much higher compression throughputs are observed on the QAT accelerator for large size data segments. On the other hand, computing on the QAT accelerator requires extra context switching in the operating system (OS) layer, which introduces additional latency. The additional latency can be significant for the small size data segments relative to the time required to perform the compression operation.

Accordingly, it is generally preferable to process (e.g., encrypt, decrypt, compress, or decompress) smaller sized data segments on the CPU while larger sized data segments are processed on the QAT accelerator.

Existing techniques, especially those deployed in deduplication storage systems, tend to focus exclusively on either the CPU or the QAT accelerator, and do not adaptively schedule tasks between the two while taking into consideration the complex factors described above. Using only the CPU for data compression can lead to excessive CPU utilization, thus negatively impacting the overall system performance. On the other hand, using exclusively the QAT accelerator for data compression can result in unsatisfactory latencies for small size data segments due to the context switch cost that is frequently incurred. Further, high compression latencies that result from queueing can be observed when the QAT accelerator is heavily utilized.

Embodiments of the disclosure relate to a smart compressor which adaptively balances workloads between the CPU and the QAT accelerator. The compressor assigns data to the appropriate computing resource based on the runtime utilization of the CPU and the QAT accelerator. It has been found from tests that some workloads are better suited for the CPU, while others for the QAT accelerator. For example, small size data segments have lower compression latencies on the CPU than on the QAT accelerator. System runtime statistics and the data segment size can be referred to as context information. By utilizing the context information in the scheduling of the CPU and the QAT accelerator computing resources, a deduplication storage system is able to achieve a higher compression performance without consuming inordinate amount of CPU resources.

Additional embodiments of the disclosure relate to a smart compressor which adaptively balances workloads between the CPU and the QAT accelerator. The compressor assigns data to the appropriate computing resource based on the QAT utilization and estimated latency. When a new data segment to be compressed is received, the compressor estimates the potential QAT latency based on the average latency for recent requests and a current pending request queue size. Thereafter it is determined whether the QAT accelerator or the CPU is to be used to compress the data segment based on the latency statistics for the QAT accelerator and the CPU. Comparing with the approach based on data segment size, this approach serves for different goals. It should be appreciated that the data segment size-based approach aims at improving throughput performance, whereas the latency-based approach more aims at improving inputs/outputs per second (TOPS). Some applications benefit more from higher throughput performance while some others benefit more from a higher TOPS and a balanced latency among compression threads. Scheduling the workloads based on the latency, the queue size and CPU utilization helps reduce the latency of each of the compression or decompressions. For example, given a certain number of compression threads and a certain data segment size, the overall number of segments that can be compressed per second can be improved the workloads are scheduled between the CPU and the QAT accelerator based on the latency, the queue size and CPU utilization. However, the throughput performance is not necessarily optimized.

A method, apparatus, and system for assigning the execution of a cryptography and/or compression operation on a data segment to either a central processing unit (CPU) or a hardware cryptography/compression accelerator is disclosed. In particular, a data segment on which a cryptography and/or compression operation is to be executed is received. Status information relating to a CPU and a hardware cryptography/compression accelerator is determined. Whether the cryptography and/or compression operation on the data segment is to be executed on the CPU or on the hardware cryptography/compression accelerator is determined based at least in part on the status information relating to the CPU and the hardware cryptography/compression accelerator. In response to determining that the cryptography and/or compression operation on the data segment is to be executed on the CPU, the data segment is forwarded to the CPU for execution of the cryptography and/or compression operation. On the other hand, in response to determining that the cryptography and/or compression operation on the data segment is to be executed on the hardware cryptography/compression accelerator, the data segment is forwarded to the hardware cryptography/compression accelerator for execution of the cryptography and/or compression operation.

In one embodiment, the status relating to the CPU and the hardware cryptography/compression accelerator comprises utilization ratios of the CPU and hardware cryptography/compression accelerator, and further operations are performed to determine whether the cryptography and/or compression operation on a data segment is to be executed on the CPU or on the hardware cryptography/compression accelerator based at least in part on the status information relating to the CPU and the hardware cryptography/compression accelerator. In particular, a data segment size threshold is determined based at least in part on the utilization ratios of the CPU and hardware cryptography/compression accelerator. A size of the data segment is determined. When the size of the data segment is below the data segment size threshold, it is determined that the cryptography and/or compression operation on the data segment is to be executed on the CPU. On the other hand, when the size of the data segment is above the data segment size threshold, it is determined that the cryptography and/or compression operation on the data segment is to be executed on the hardware cryptography/compression accelerator.

In one embodiment, to determine the data segment size threshold based at least in part on the utilization ratios of the CPU and hardware cryptography/compression accelerator, a lookup operation in a CPU utilization to data segment size threshold mapping table is performed. The data segment size threshold increases as the utilization ratio of the CPU decreases, and vice versa.

In one embodiment, the data segment size threshold is set to 0 when the utilization ratio of the CPU exceeds a first alarm level, and the data segment size threshold is set to a maximum value when the utilization ratio of the hardware cryptography/compression accelerator exceeds a second alarm level. In one embodiment, the CPU utilization to data segment size threshold mapping table, the first alarm level, and the second alarm level are user-defined.

In a different embodiment, the status relating to the CPU and the hardware cryptography/compression accelerator comprises average recent latency measurements of the CPU and hardware cryptography/compression accelerator and a current queue size of the hardware cryptography/compression accelerator, and further operations are performed to determine whether the cryptography and/or compression operation on a data segment is to be executed on the CPU or on the hardware cryptography/compression accelerator based at least in part on the status information relating to the CPU and the hardware cryptography/compression accelerator. In particular, whether the hardware cryptography/compression accelerator is in a busy state is determined based on the average recent latency measurement and the current queue size of the hardware cryptography/compression accelerator. In response to determining that the hardware cryptography/compression accelerator is not in a busy state, it is determined that the cryptography and/or compression operation on the data segment is to be executed on the hardware cryptography/compression accelerator. On the other hand, in response to determining that the hardware cryptography/compression accelerator is in a busy state, the average recent latency measurement of the hardware cryptography/compression accelerator is compared against the average recent latency measurement of the CPU. When the average recent latency measurement of the hardware cryptography/compression accelerator is higher than the average recent latency measurement of the CPU, it is determined that the cryptography and/or compression operation on the data segment is to be executed on the CPU. On the other hand, when the average recent latency measurement of the hardware cryptography/compression accelerator is lower than the average recent latency measurement of the CPU, it is determined that the cryptography and/or compression operation on the data segment is to be executed on the hardware cryptography/compression accelerator. In one embodiment, the hardware cryptography/compression accelerator is determined to be in a busy state when the average recent latency measurement of the hardware cryptography/compression accelerator exceeds a latency threshold and/or when the current queue size of the hardware cryptography/compression accelerator exceeds a queue size threshold.

In one embodiment, the hardware cryptography/compression accelerator is a companion chip to the CPU (e.g., an Intel QAT accelerator connected to the CPU via a peripheral component interconnect express "PCIe" bus). In one embodiment the cryptography and/or compression operation on the data segment may be one of: a symmetric cryptography function (e.g., cipher operations, authentication operations, etc.) applied to the data segment, an asymmetric cryptography function (e.g., a public key function such as RSA, Diffie-Hellman, or an elliptic curve cryptography function) applied to the data segment, a compression function applied to the data segment, or a decompression function applied to the data segment.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

Referring to FIG. 2, a diagram illustrating a table 200 setting forth compression latencies on the CPU and the QAT accelerator for data segments of different sizes is shown. As can be seen in FIG. 2, small size data segments are associated with lower latencies on the CPU than on the QAT accelerator. This is because invoking the QAT accelerator introduces an extra context switching cost, which has a relatively larger impact on smaller sized workloads. On the other hand, for large size data segments, the QAT accelerator exhibits higher compression throughputs. Accordingly, FIG. 2 suggests that the decision to assign a compression task to either the CPU or the QAT accelerator can be made based on the size of the data segment to be compressed.

Figure 3:
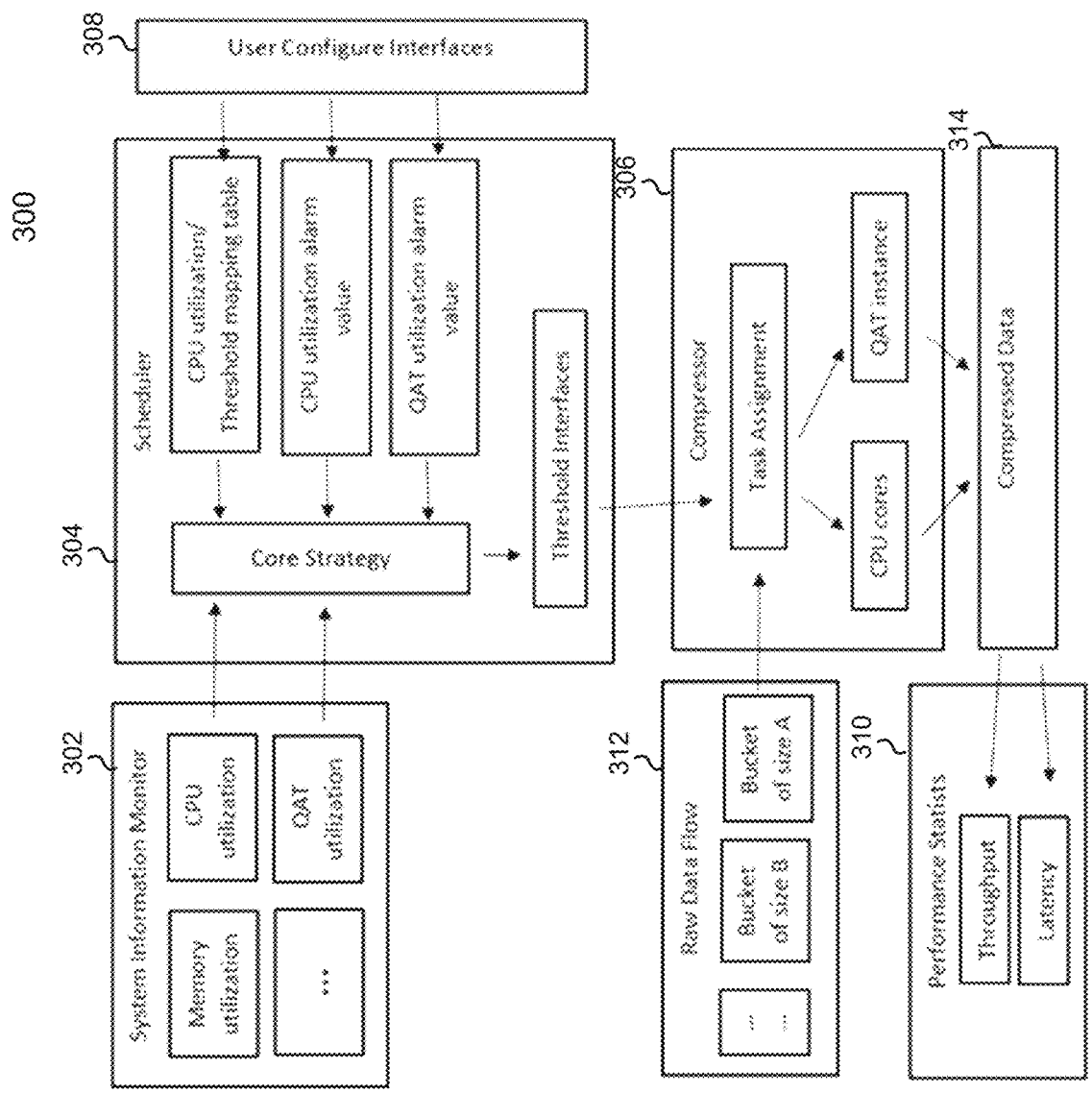
FIG. 3 is a block diagram illustrating various example components utilized in embodiments of the disclosure.

Referring to FIG. 3, a block diagram 300 illustrating various example components utilized in embodiments of the disclosure is shown. System information monitor 302, scheduler 304, compressor 306, and user configuration interfaces 308 can be implemented in hardware, software, or a combination thereof. System information monitor 302 periodically checks QAT accelerator and CPU utilization ratios in runtime, and provides the information to scheduler 304. The threshold interfaces of scheduler 304 provide the methods for determining, setting, and providing the data segment size threshold at runtime. Compressor 306 receives the data segment size threshold through the threshold interfaces of scheduler 304. Compressor 306 compares the size of each incoming data segment with the data segment size threshold, and determines accordingly whether to assign the processing of the data segment to either the CPU or the QAT accelerator. Depending on the assignment, either the CPU or the QAT accelerator generates compressed data 314. User configuration interfaces 308 are used by a user to configure the CPU utilization alarm value/level, the QAT accelerator utilization alarm value/level, and the CPU utilization to data segment size threshold mapping table, which will be described in greater detail below. The user may also configure the interval time of schedule periods. Performance statistics 310, which comprise throughput, latency, etc., provide feedbacks to the user. In one embodiment, in the raw data flow 312, data segments are grouped into buckets based on their sizes, where data segments of a similar size are grouped into the same bucket.

Figure 4:
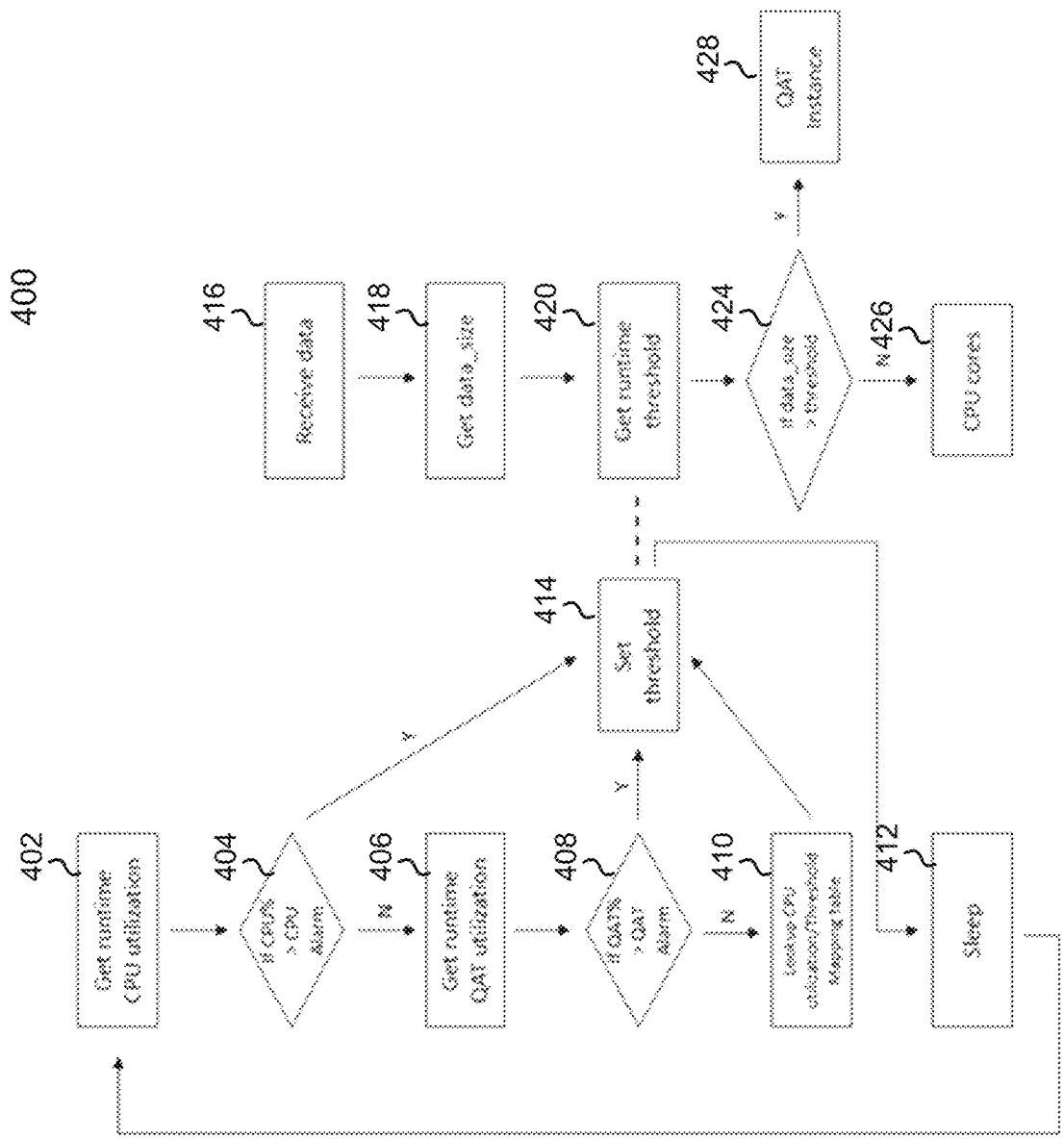
FIG. 4 is a flowchart illustrating an example method for assigning the processing of a data segment to either a CPU or a QAT accelerator according to one embodiment.

Referring to FIG. 4, a flowchart illustrating an example method 400 for assigning the processing of a data segment to either a CPU or a QAT accelerator according to one embodiment is shown. Method 400 can be implemented in hardware, software, or a combination thereof. At blocks 402 and 406, utilization ratios of the CPU and QAT accelerator are determined, respectively. At block 414, the data segment size threshold is set to a minimum value (e.g., 0) when it is determined at block 404 that the utilization ratio of the CPU exceeds a first alarm level (i.e., the CPU utilization alarm level). The data segment size threshold is set to a maximum value (e.g., infinity) at block 414 when it is determined at block 408 that the utilization ratio of the QAT accelerator exceeds a second alarm level (i.e., the QAT accelerator utilization alarm level). If neither alarm levels are exceeded, at block 410, a lookup operation in a CPU utilization to data segment size threshold mapping table is performed, and a data segment size threshold is set accordingly at block 414. After the data segment size threshold is set at block 414, the scheduler goes to sleep at block 412 before restarting at block 402. At block 416, a data segment on which a cryptography and/or compression operation is to be executed is received. At block 418, a size of the data segment is determined. At block 420, a runtime data segment size threshold is obtained according to the threshold set at block 414. When the size of the data segment is below the data segment size threshold, at block 424, it is determined that the cryptography and/or compression operation on the data segment is to be executed on the CPU. On the other hand, when the size of the data segment is above the data segment size threshold, at block 424, it is determined that the cryptography and/or compression operation on the data segment is to be executed on the QAT accelerator. At block 426, in response to determining that the cryptography and/or compression operation on the data segment is to be executed on the CPU, the data segment is forwarded to the CPU for execution of the cryptography and/or compression operation. On the other hand, at block 428, in response to determining that the cryptography and/or compression operation on the data segment is to be executed on the QAT accelerator, the data segment is forwarded to the QAT accelerator for execution of the cryptography and/or compression operation.

Figure 5:
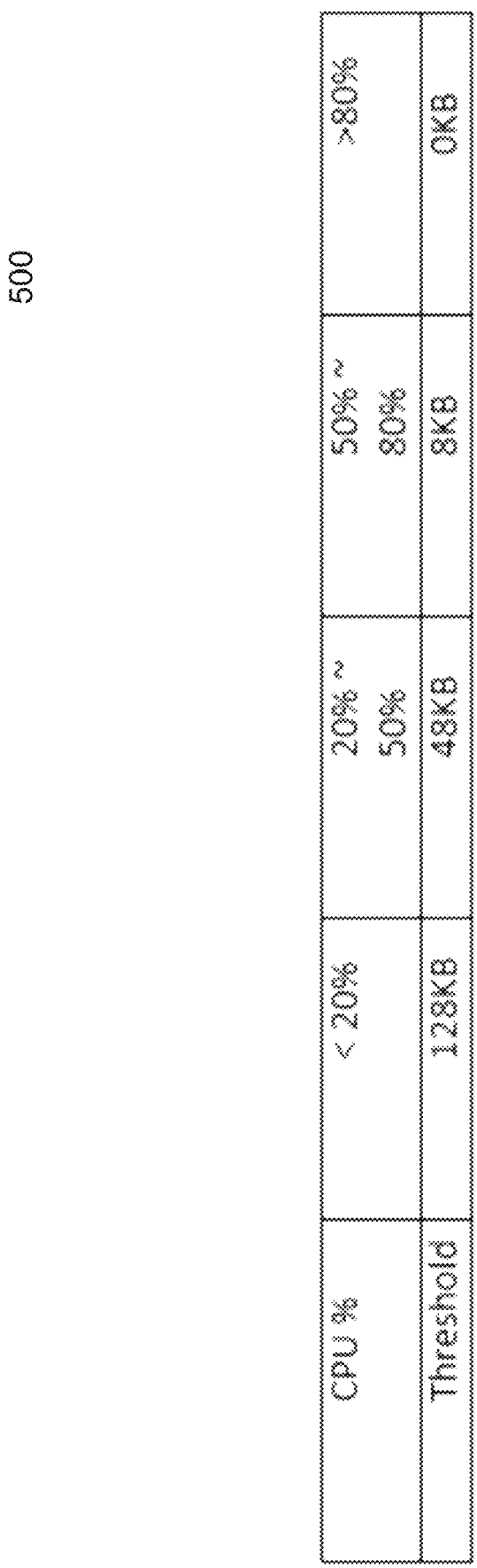
FIG. 5 is a diagram illustrating an example CPU utilization to data segment size threshold mapping table according to one embodiment.

Referring to FIG. 5, a diagram illustrating an example CPU utilization to data segment size threshold mapping table 500 according to one embodiment is shown. Table 500 is a key-value mapping between CPU utilization ratio ranges and data segment size thresholds. As can be seen, the data segment size threshold increases as the utilization ratio of the CPU decreases, and vice versa. It should be appreciated that here the 80% utilization ratio can be understood as the first alarm level, at which point and above the data segment size threshold is set to 0. The CPU utilization to data segment size threshold mapping table may be user-configurable. In another embodiment, CPU utilization to data segment size threshold mapping table may be trained with artificial intelligence/machine learning techniques.

Figure 6:
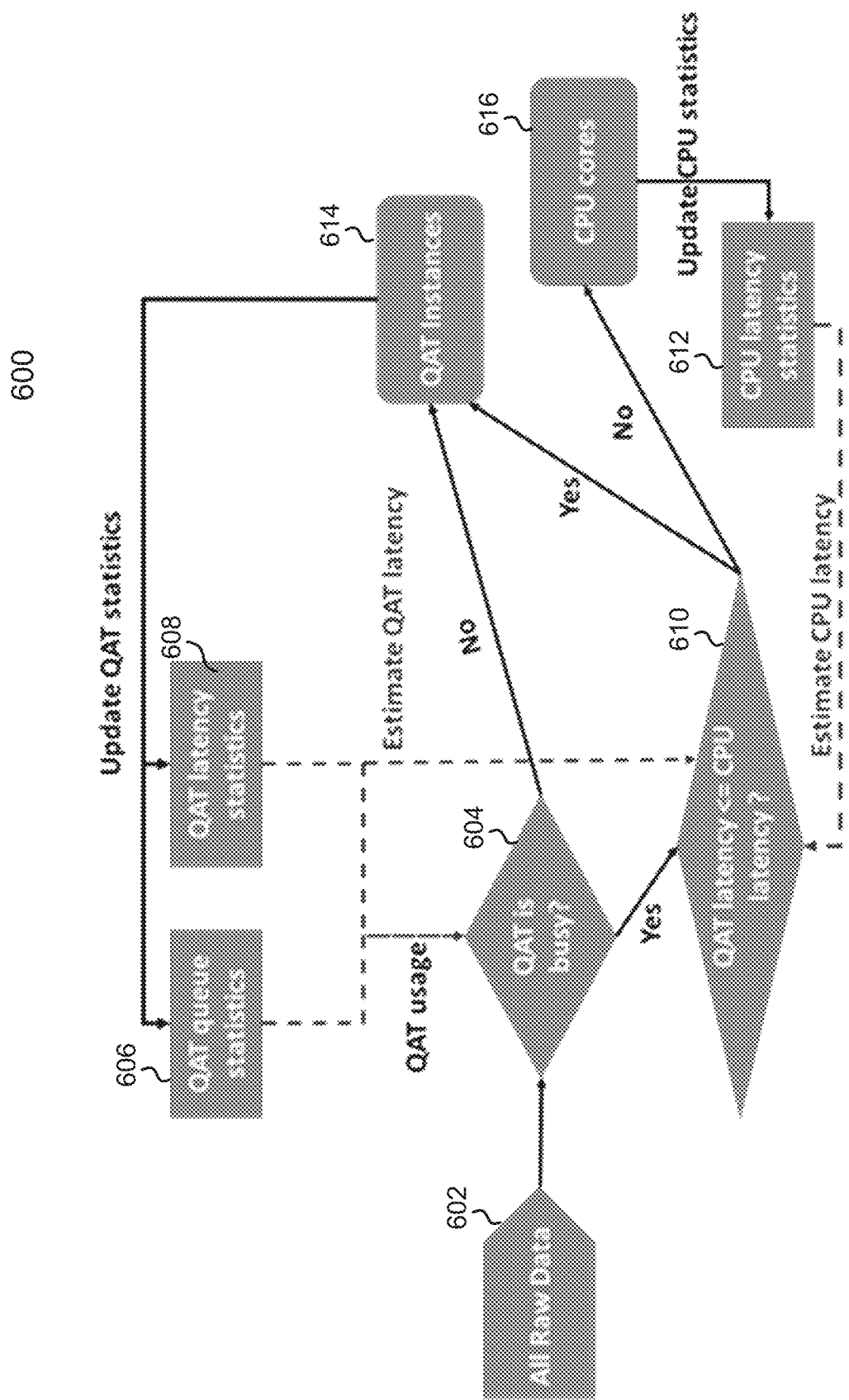
FIG. 6 is a flowchart illustrating an example method for assigning the processing of a data segment to either a CPU or a QAT accelerator according to one embodiment.

Referring to FIG. 6, a flowchart illustrating an example method 600 for assigning the processing of a data segment to either a CPU or a QAT accelerator according to one embodiment is shown. Method 600 may be implemented in hardware, software, or a combination thereof. At block 602, a data segment on which a cryptography and/or compression operation is to be executed is received. Average recent latency measurements 612, 608 of the CPU and QAT accelerator and a current queue size of the QAT accelerator 606 are determined. At block 604, whether the QAT accelerator is in a busy state is determined based on the average recent latency measurement 608 and the current queue size 606 of the QAT accelerator. In response to determining that the QAT accelerator is not in a busy state, at block 614, it is determined that the cryptography and/or compression operation on the data segment is to be executed on the QAT accelerator. On the other hand, in response to determining that the QAT accelerator is in a busy state, at block 610, the average recent latency measurement of the QAT accelerator 608 is compared against the average recent latency measurement of the CPU 612. When the average recent latency measurement of the QAT accelerator 608 is higher than the average recent latency measurement of the CPU 612, at block 616, it is determined that the cryptography and/or compression operation on the data segment is to be executed on the CPU. On the other hand, when the average recent latency measurement of the QAT accelerator 608 is lower than the average recent latency measurement of the CPU 612, at block 614, it is determined that the cryptography and/or compression operation on the data segment is to be executed on the QAT accelerator. In one embodiment, the QAT accelerator is determined to be in a busy state when the average recent latency measurement of the QAT accelerator 608 exceeds a latency threshold and/or when the current queue size of the QAT accelerator 606 exceeds a queue size threshold.

In response to determining that the cryptography and/or compression operation on the data segment is to be executed on the CPU, the data segment is forwarded to the CPU for execution of the cryptography and/or compression operation. On the other hand, in response to determining that the cryptography and/or compression operation on the data segment is to be executed on the QAT accelerator, the data segment is forwarded to the QAT accelerator for execution of the cryptography and/or compression operation.

Figure 7:
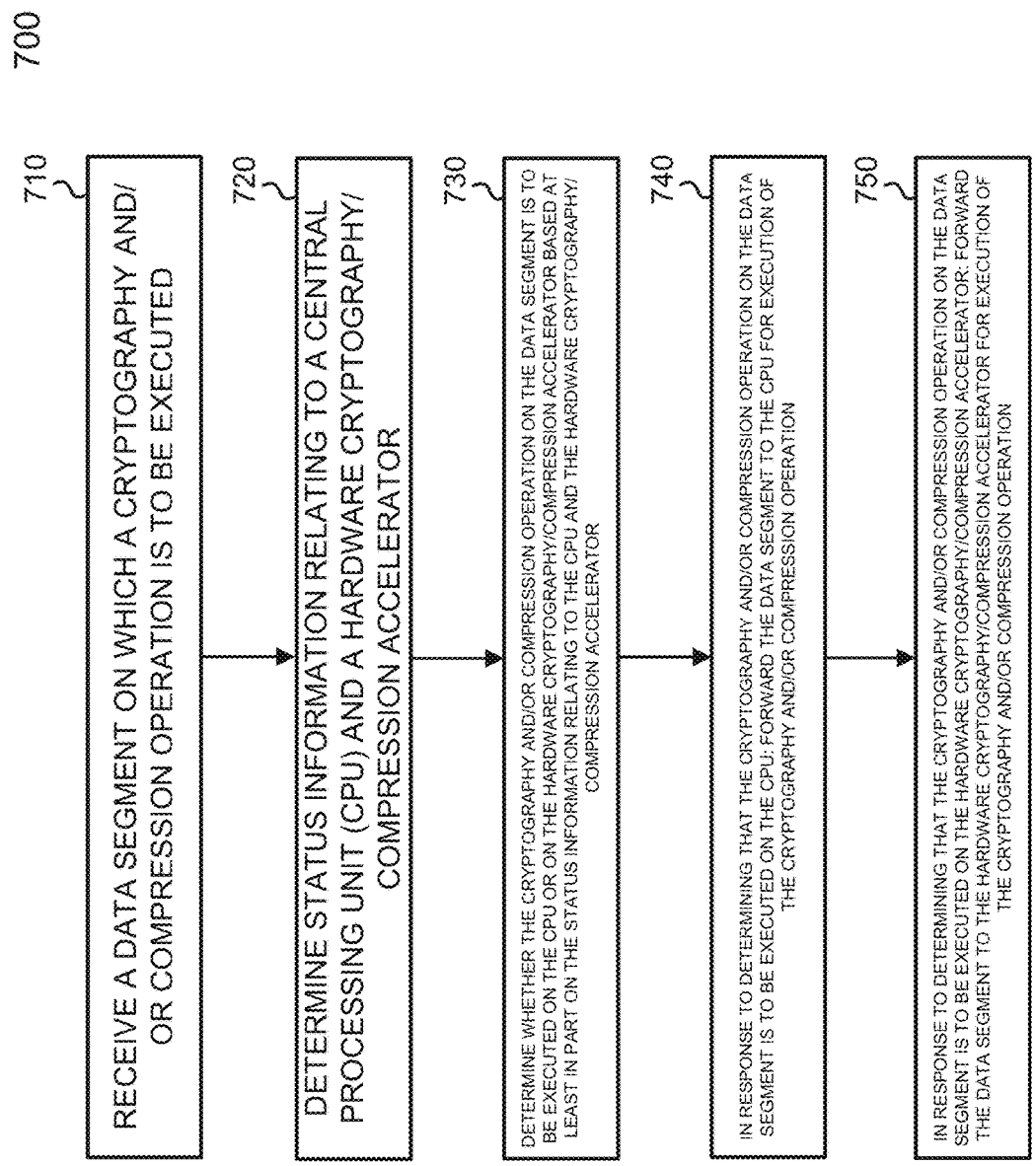
FIG. 7 is a flowchart illustrating an example method for assigning the execution of a cryptography and/or compression operation on a data segment to either a CPU or a hardware cryptography/compression accelerator according to one embodiment.

Referring to FIG. 7, a flowchart illustrating an example method 700 for assigning the execution of a cryptography and/or compression operation on a data segment to either a central processing unit (CPU) or a hardware cryptography/compression accelerator according to one embodiment is shown. Process 700 may be performed by processing logic that includes hardware (e.g. circuitry, dedicated logic, etc.), software (e.g., embodied on a non-transitory computer readable medium), or a combination thereof. For example, process 700 may be performed by processor(s) 1501 of FIG. 8. At block 710, a data segment on which a cryptography and/or compression operation is to be executed is received. At block 720, status information relating to a CPU and a hardware cryptography/compression accelerator is determined. At block 730, whether the cryptography and/or compression operation on the data segment is to be executed on the CPU or on the hardware cryptography/compression accelerator is determined based at least in part on the status information relating to the CPU and the hardware cryptography/compression accelerator. At block 740, in response to determining that the cryptography and/or compression operation on the data segment is to be executed on the CPU, the data segment is forwarded to the CPU for execution of the cryptography and/or compression operation. On the other hand, at block 750, in response to determining that the cryptography and/or compression operation on the data segment is to be executed on the hardware cryptography/compression accelerator, the data segment is forwarded to the hardware cryptography/compression accelerator for execution of the cryptography and/or compression operation.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
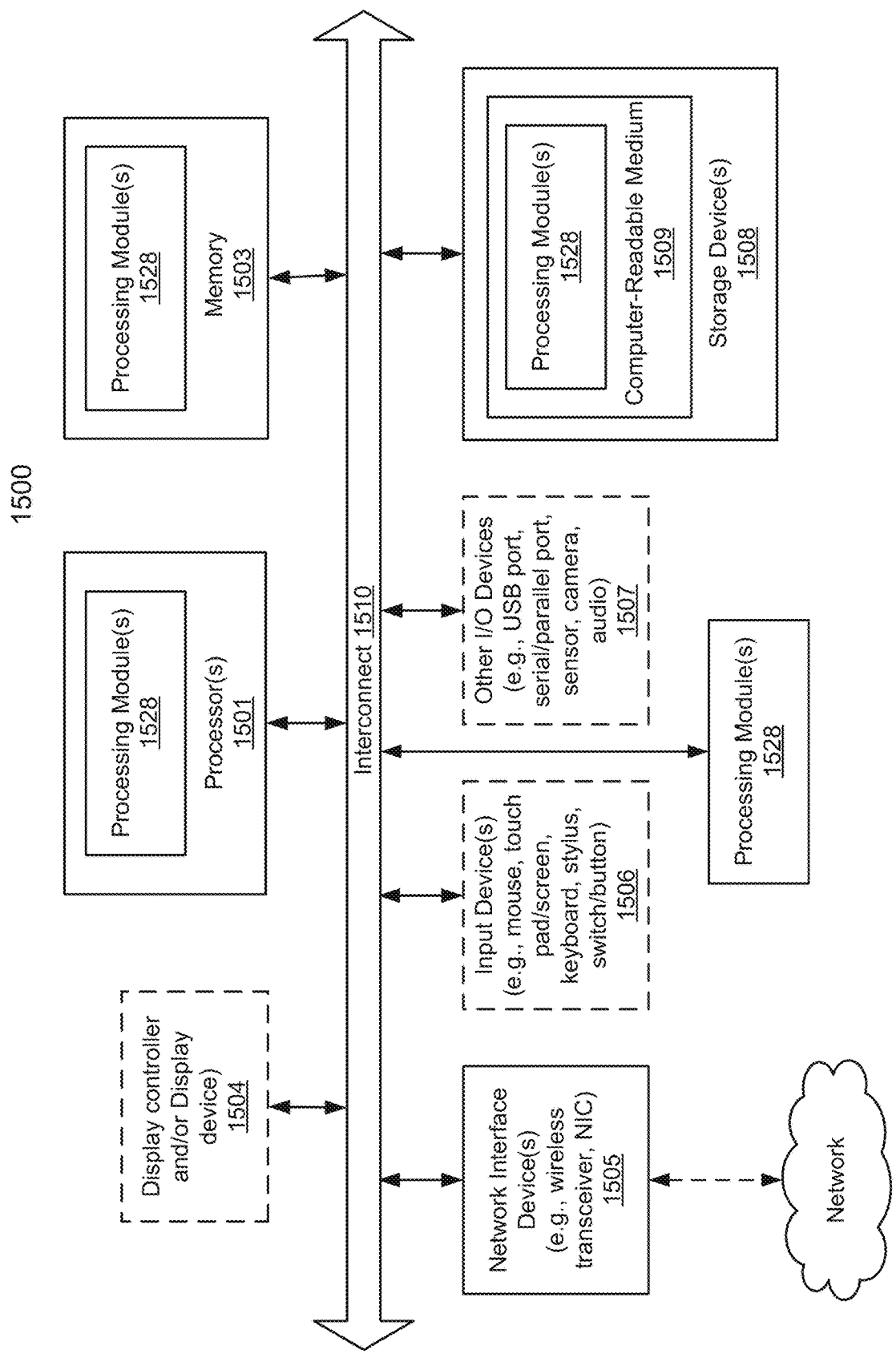
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a system information monitor, a scheduler, a compressor, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Embodiments of the disclosure relate to adaptively assigning the execution of data segment cryptography/compression operations to either a CPU or a hardware cryptography/compression accelerator. The embodiments can improve system performance, as they enable lower processing latencies for small size data segments processed on the CPU and higher processing throughputs for large size data segments processed on the hardware cryptography/compression accelerator. The performance advantages can be realized in a deduplication storage system where many compute-intensive tasks are running simultaneously, as well as in a secondary storage product that runs non-traditional backup workloads such data analysis, instance access, and instance recovery. The scheduling between the CPU and the hardware cryptography/compression accelerator is adaptive to the runtime workloads and system statistics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for offloading a cryptography and/or compression operation to a hardware accelerator, comprising:

obtaining a data file and dividing the data file into a plurality of data segments for deduplicated storage, wherein the plurality of data segments are grouped into buckets for the cryptography and/or compression operation prior to being deduplicatively stored based on a size of each of the plurality of data segments, the plurality of data segments of a similar size being grouped into a same bucket;

obtaining a data segment of the plurality of data segments and on which the cryptography and/or compression operation is to be executed to deduplicatively store the plurality of data segments against other data segments deduplicatively stored;

determining status information relating to a central processing unit (CPU) and the hardware accelerator for use in the deduplicative storage of the plurality of data segments, wherein the status information relating to the CPU and the hardware accelerator comprises utilization ratios of the CPU and the hardware accelerator;

determining whether the cryptography and/or compression operation on the data segment is to be executed on the CPU or on the hardware accelerator based at least in part on a data segment size threshold and the status information relating to the CPU and the hardware accelerator to meet a compression performance goal, wherein the data segment size threshold is one of a plurality of data segment size thresholds that are respectively mapped to one or more of the utilization ratios of the CPU and the hardware accelerator;

in response to determining that the cryptography and/or compression operation on the data segment is to be executed on the CPU:

forwarding the data segment to the CPU for execution of the cryptography and/or compression operation to obtain a processing result;

in response to determining that the cryptography and/or compression operation on the data segment is to be executed on the hardware accelerator:

forwarding the data segment to the hardware accelerator for execution of the cryptography and/or compression operation to obtain the processing result; and deduplicatively storing the data file in one or more deduplicated storage units of a storage system using the processing result, wherein a first portion of the plurality of data segments are stored in the storage system and copies of a second portion of the plurality of data segments were previously stored in the storage system, wherein new copies of the second portion of the plurality of data segments are discarded without any new copies of the second portion being stored in the storage system to deduplicatively store the data file when it is determined that the copies of the second portion have been previously stored, wherein the data segment size threshold is set to 0 when the utilization ratio of the CPU exceeds a first alarm level, wherein the data segment size threshold is set to a maximum value when the utilization ratio of the hardware accelerator exceeds a second alarm level, and wherein when the utilization ratio of the CPU does not exceed the first alarm level and the utilization ratio of the hardware accelerator does not exceed the second alarm level, a lookup operation in a CPU utilization to data segment size threshold mapping table is performed, and a data segment size threshold is set.

2. The method of claim 1, wherein determining whether the cryptography and/or compression operation on a data segment is to be executed on the CPU or on the hardware accelerator based at least in part on the status information relating to the CPU and the hardware accelerator further comprises:
- determining the data segment size threshold based at least in part on the utilization ratios of the CPU and hardware accelerator;
- determining a size of the data segment;
- when the size of the data segment is below the data segment size threshold, determining that the cryptography and/or compression operation on the data segment is to be executed on the CPU; and
- when the size of the data segment is above the data segment size threshold, determining that the cryptography and/or compression operation on the data segment is to be executed on the hardware accelerator.

3. The method of claim 2, wherein determining the data segment size threshold based at least in part on the utilization ratios of the CPU and hardware accelerator comprises performing a lookup operation in the CPU utilization to data segment size threshold mapping table, and wherein the data segment size threshold increases as the utilization ratio of the CPU decreases, and vice versa.

4. The method of claim 1, wherein the CPU utilization to data segment size threshold mapping table, the first alarm level, and the second alarm level are user-defined and configured via user configuration interfaces.

5. The method of claim 1, wherein the hardware accelerator is a companion chip to the CPU.

6. The method of claim 1, wherein the second portion of the plurality of data segments is obtained by generating a fingerprint for each data segment of the second portion of the plurality of data segments using the hardware accelerator, performing a match of each respective fingerprint associated with each data segment of the second portion of the plurality of data segments to fingerprints of other data segments deduplicatively stored in the storage system, and identifying the second portion based on the match.

7. A non-transitory machine-readable medium for offloading a cryptography and/or compression operation to a hardware accelerator having instructions stored therein, which when executed by a processor, cause the processor to perform data processing operations, the operations comprising:
- obtaining a data file and dividing the data file into a plurality of data segments for deduplicated storage, wherein the plurality of data segments are grouped into buckets for the cryptography and/or compression operation prior to being deduplicatively stored based on a size of each of the plurality of data segments, the plurality of data segments of a similar size being grouped into a same bucket;
- obtaining a data segment of the plurality of data segments and on which the cryptography and/or compression operation is to be executed to deduplicatively store the plurality of data segments against other data segments deduplicatively stored;
- determining status information relating to a central processing unit (CPU) and the hardware accelerator for use in the deduplicative storage of the plurality of data segments, wherein the status information relating to the CPU and the hardware accelerator comprises utilization ratios of the CPU and the hardware accelerator;
- determining whether the cryptography and/or compression operation on the data segment is to be executed on the CPU or on the hardware accelerator based at least in part on a data segment size threshold and the status information relating to the CPU and the hardware accelerator to meet a compression performance goal, wherein the data segment size threshold is one of a plurality of data segment size thresholds that are respectively mapped to one or more of the utilization ratios of the CPU and the hardware accelerator;
- in response to determining that the cryptography and/or compression operation on the data segment is to be executed on the CPU: forwarding the data segment to the CPU for execution of the cryptography and/or compression operation to obtain a processing result;
- in response to determining that the cryptography and/or compression operation on the data segment is to be executed on the hardware accelerator: forwarding the data segment to the hardware accelerator for execution of the cryptography and/or compression operation to obtain the processing result; and
- deduplicatively storing the data file in one or more deduplicated storage units of a storage system using the processing result, wherein a first portion of the plurality of data segments are stored in the storage system and copies of a second portion of the plurality of data segments were previously stored in the storage system, wherein new copies of the second portion of the plurality of data segments are discarded without any new copies of the second portion being stored in the storage system to deduplicatively store the data file when it is determined that the copies of the second portion have been previously stored,
- wherein the data segment size threshold is set to 0 when the utilization ratio of the CPU exceeds a first alarm level,
- wherein the data segment size threshold is set to a maximum value when the utilization ratio of the hardware accelerator exceeds a second alarm level, and
- wherein when the utilization ratio of the CPU does not exceed the first alarm level and the utilization ratio of the hardware accelerator does not exceed the second alarm level, a lookup operation in a CPU utilization to data segment size threshold mapping table is performed, and a data segment size threshold is set.

8. The non-transitory machine-readable medium of claim 7, wherein determining whether the cryptography and/or compression operation on a data segment is to be executed on the CPU or on the hardware accelerator based at least in part on the status information relating to the CPU and the hardware accelerator further comprises:
- determining the data segment size threshold based at least in part on the utilization ratios of the CPU and hardware accelerator;
- determining a size of the data segment;
- when the size of the data segment is below the data segment size threshold, determining that the cryptography and/or compression operation on the data segment is to be executed on the CPU; and
- when the size of the data segment is above the data segment size threshold, determining that the cryptography and/or compression operation on the data segment is to be executed on the hardware accelerator.

9. The non-transitory machine-readable medium of claim 8, wherein determining the data segment size threshold based at least in part on the utilization ratios of the CPU and hardware accelerator comprises performing a lookup operation in the CPU utilization to data segment size threshold mapping table, and wherein the data segment size threshold increases as the utilization ratio of the CPU decreases, and vice versa.

10. The non-transitory machine-readable medium of claim 7, wherein the CPU utilization to data segment size threshold mapping table, the first alarm level, and the second alarm level are user-defined and configured via user configuration interfaces.

11. The non-transitory machine-readable medium of claim 7 wherein the hardware accelerator is a companion chip to the CPU.

12. The non-transitory machine-readable medium of claim 7, wherein the second portion of the plurality of data segments is obtained by generating a fingerprint for each data segment of the second portion of the plurality of data segments using the hardware accelerator, performing a match of each respective fingerprint associated with each data segment of the second portion of the plurality of data segments to fingerprints of other data segments deduplicatively stored in the storage system, and identifying the second portion based on the match.

13. A data processing system for offloading a cryptography and/or compression operation to a hardware accelerator, comprising: a processor; and a memory coupled to the processor to store instructions, which when executed by the processor, cause the processor to perform data processing operations, the operations including:
  obtaining a data file and dividing the data file into a plurality of data segments for deduplicated storage, wherein the plurality of data segments are grouped into buckets for the cryptography and/or compression operation prior to being deduplicatively stored based on a size of each of the plurality of data segments, the plurality of data segments of a similar size being grouped into a same bucket;
  obtaining a data segment of the plurality of data segments and on which the cryptography and/or compression operation is to be executed to deduplicatively store the plurality of data segments against other data segments deduplicatively stored;
  determining status information relating to a central processing unit (CPU) and the hardware accelerator for use in the deduplicative storage of the plurality of data segments, wherein the status information relating to the CPU and the hardware accelerator comprises utilization ratios of the CPU and the hardware accelerator;
  determining whether the cryptography and/or compression operation on the data segment is to be executed on the CPU or on the hardware accelerator based at least in part on a data segment size threshold and the status information relating to the CPU and the hardware accelerator to meet a compression performance goal, wherein the data segment size threshold is one of a plurality of data segment size thresholds that are respectively mapped to one or more of the utilization ratios of the CPU and the hardware accelerator;
  in response to determining that the cryptography and/or compression operation on the data segment is to be executed on the CPU: forwarding the data segment to the CPU for execution of the cryptography and/or compression operation to obtain a processing result;
  in response to determining that the cryptography and/or compression operation on the data segment is to be executed on the hardware accelerator: forwarding the data segment to the hardware accelerator for execution of the cryptography and/or compression operation to obtain the processing result; and
  deduplicatively storing the data file in one or more deduplicated storage units of a storage system using the processing result, wherein a first portion of the plurality of data segments are stored in the storage system and copies of a second portion of the plurality of data segments were previously stored in the storage system, wherein new copies of the second portion of the plurality of data segments are discarded without any new copies of the second portion being stored in the storage system to deduplicatively store the data file when it is determined that the copies of the second portion have been previously stored,
  wherein the data segment size threshold is set to 0 when the utilization ratio of the CPU exceeds a first alarm level, wherein the data segment size threshold is set to a maximum value when the utilization ratio of the hardware accelerator exceeds a second alarm level, and wherein when the utilization ratio of the CPU does not exceed the first alarm level and the utilization ratio of the hardware accelerator does not exceed the second alarm level, a lookup operation in a CPU utilization to data segment size threshold mapping table is performed, and a data segment size threshold is set.

14. The data processing system of claim 13, wherein determining whether the cryptography and/or compression operation on a data segment is to be executed on the CPU or on the hardware accelerator based at least in part on the status information relating to the CPU and the hardware accelerator further comprises:
  determining the data segment size threshold based at least in part on the utilization ratios of the CPU and hardware accelerator;
  determining a size of the data segment;
  when the size of the data segment is below the data segment size threshold, determining that the cryptography and/or compression operation on the data segment is to be executed on the CPU; and
  when the size of the data segment is above the data segment size threshold, determining that the cryptography and/or compression operation on the data segment is to be executed on the hardware accelerator.

15. The data processing system of claim 14, wherein determining the data segment size threshold based at least in part on the utilization ratios of the CPU and hardware accelerator comprises performing a lookup operation in the CPU utilization to data segment size threshold mapping table, and wherein the data segment size threshold increases as the utilization ratio of the CPU decreases, and vice versa.

16. The data processing system of claim 13, wherein the CPU utilization to data segment size threshold mapping table, the first alarm level, and the second alarm level are user-defined defined and configured via user configuration interfaces.

17. The data processing system of claim 13, wherein the second portion of the plurality of data segments is obtained by generating a fingerprint for each data segment of the second portion of the plurality of data segments using the hardware accelerator, performing a match of each respective fingerprint associated with each data segment of the second portion of the plurality of data segments to fingerprints of other data segments deduplicatively stored in the storage system, and identifying the second portion based on the match.

18. The data processing system of claim 13, wherein the cryptography and/or compression operation on the data segment comprises one of: a symmetric cryptography function applied to the data segment, an asymmetric cryptography function applied to the data segment, a compression function applied to the data segment, or a decompression function applied to the data segment.

\* \* \* \* \*